INVENTORS
HENRY E. STEIN
HENRY V. MOG
JOHN W. STERTZER
By Herschel C. Omohundro

May 1, 1956

H. E. STEIN ET AL 2,743,604

APPARATUS FOR HYDROSTATICALLY TESTING ROCKET
BODIES OR OTHER OPEN-ENDED CONTAINERS

Filed April 29, 1952

INVENTORS
HENRY E. STEIN
HENRY V. MOG
JOHN W. STERTZER

BY Herschel C. Omohundro

May 1, 1956

H. E. STEIN ET AL 2,743,604

APPARATUS FOR HYDROSTATICALLY TESTING ROCKET
BODIES OR OTHER OPEN-ENDED CONTAINERS

Filed April 29, 1952

INVENTORS
HENRY E. STEIN
HENRY V. MOG
JOHN W. STERTZER

BY Herschel C. Omohundro

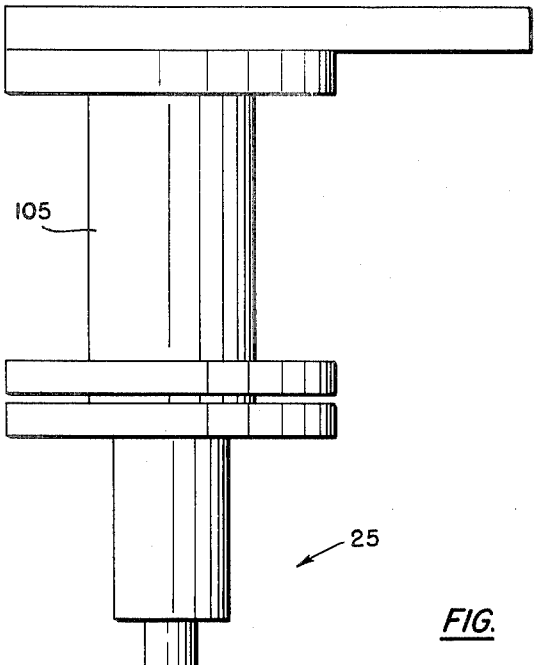
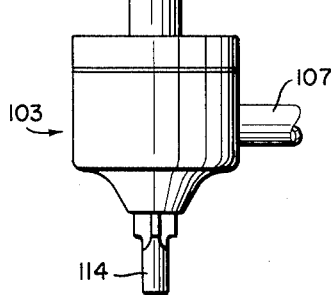
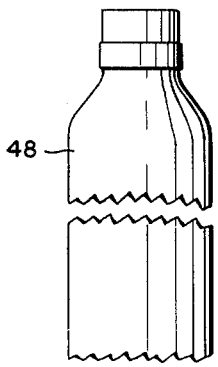
FIG. 10
FIG. 9
FIG. 11

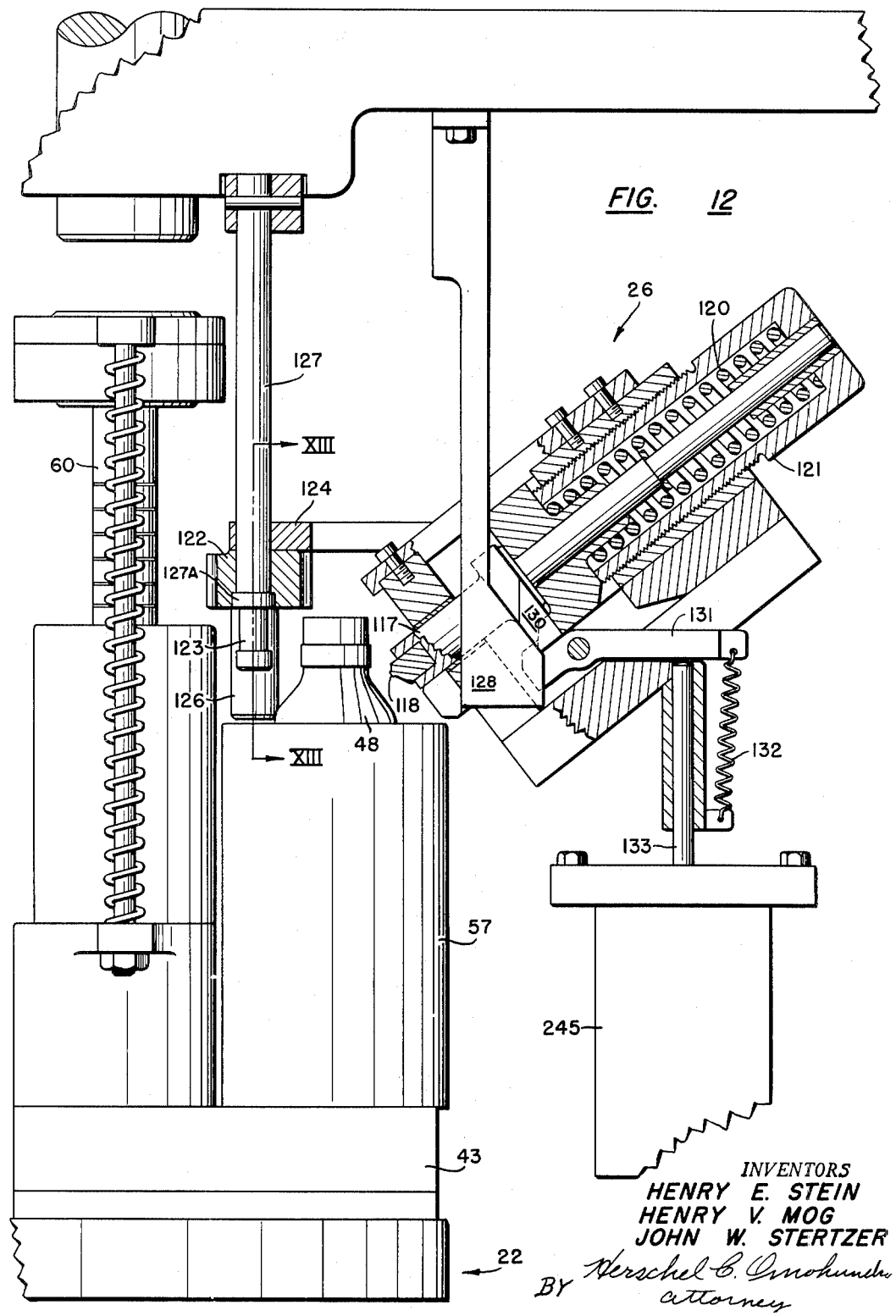

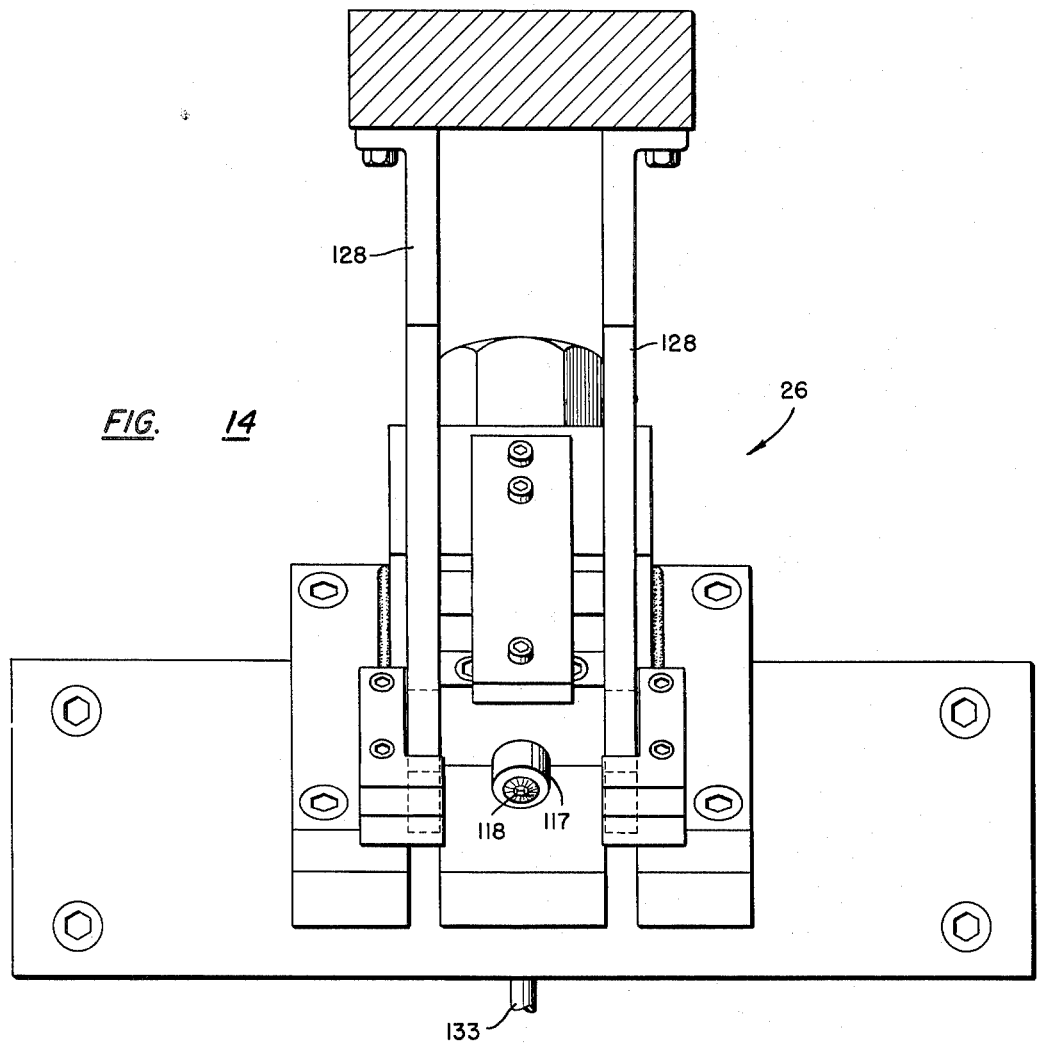
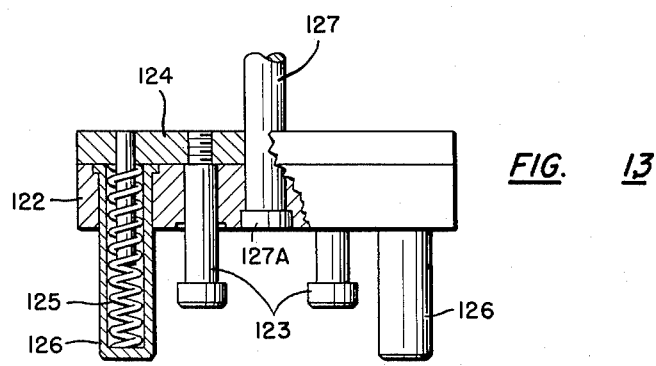

United States Patent Office 2,743,604
Patented May 1, 1956

2,743,604

APPARATUS FOR HYDROSTATICALLY TESTING ROCKET BODIES OR OTHER OPEN-ENDED CONTAINERS

Henry E. Stein, Worthington, and Henry V. Mog and John W. Stertzer, Columbus, Ohio, assignors to The Denison Engineering Company, Columbus, Ohio Application April 29, 1952, Serial No. 284,876

20 Claims. (Cl. 73—49.4)

This invention relates generally to the hydraulic art and is more particularly directed to apparatus for hydrostatically testing open-ended containers of the type used for the bodies of rocket shells.

Still more particularly the invention relates to a mechanism for sealing the ends of open-ended bodies, filling these bodies with testing fluid, applying hydrostatic pressure to the fluid within the bodies, marking the bodies so tested and removing the seals therefrom to release the bodies for further processing.

An object of this invention is to provide apparatus for performing all of the operations set forth in the preceding paragraph automatically substantially without attention on the part of the operator other than applying the bodies to be tested to the machine and removing the same therefrom after testing.

An object of this invention is to provide hydraulically operated apparatus for performing the desired tests on open-ended container bodies, this apparatus being in part electrically controlled so that in the event any container body does not meet a required test the mechanism will be rendered inoperative until the unsuitable body is removed and the machine again placed in operation.

Another object of the invention is to provide a hydraulic press having a ram and index table, the latter being intermittently operated to successively dispose bodies to be tested adjacent to the ram so that fluid contained within the bodies may be placed under intensified pressure through the actuation of the ram, suitable fluid pressure intensifying means being carried by the table and actuated by the ram when the bodies are properly positioned with respect thereto.

Another object of the invention is to provide the machine mentioned in the preceding paragraph with mechanism for holding the bodies to be tested and other mechanism for securing the bodies on the holders in substantially fluid tight relationship so that the test may be successfully performed on the bodies.

A still further object of the invention is to provide the hydraulic press mentioned in the preceding paragraphs with means for filling the container bodies with a testing fluid after the bodies have been applied to the holders on the index table.

Another object of the invention is to provide the testing apparatus with fluid pressure responsive means for imparting rotary movement to the container bodies to screw the same onto holders and to provide fluid pressure operated means for chucking or otherwise connecting the container bodies to the fluid pressure operated means for rotating the same.

Another object of the invention is to provide a novel container holding and testing mechanism having means for sealing both ends of the container and applying hydrostatic pressure to the interior of the container while it is so held.

A further object of the invention is to provide testing apparatus of the types mentioned previously with novel hydraulic circuits for effecting the operation of the various parts of the apparatus and electro-responsive means for controlling various parts of the hydraulic system so that the operations will be performed in proper sequence, additional electrical means being provided to render the machine inoperative in the event of failure of any one of the hydraulically-operated parts.

Further objects and advantages of the present invention will be apparent from the followings description, reference being had to the accompanying drawings wherein a preferred form of embodiment of the invention is clearly shown.

In the drawings:

Fig. 9 is a front elevational view of mechanism employed to release the seal at one end of the container body and fill such body with testing fluid.

Fig. 10 is a detail vertical sectional view taken through a portion of the mechanism shown in Fig. 9 and showing the mechanism in one stage of operation.

Fig. 11 is a similar view showing the mechanism in a more advanced stage of operation.

Fig. 12 is a view partly in elevation and partly in section showing mechanism for testing the container body and applying informative indicia thereto.

Fig. 13 is a detail vertical sectional view taken on the plane indicated by the line XIII—XIII of Fig. 12 and shows the details of construction of the bar for backing up the rocket body while it is being stamped.

Fig. 14 is a front elevational view of the mechanism used to stamp indicia on the rocket bodies.

Figure 1:
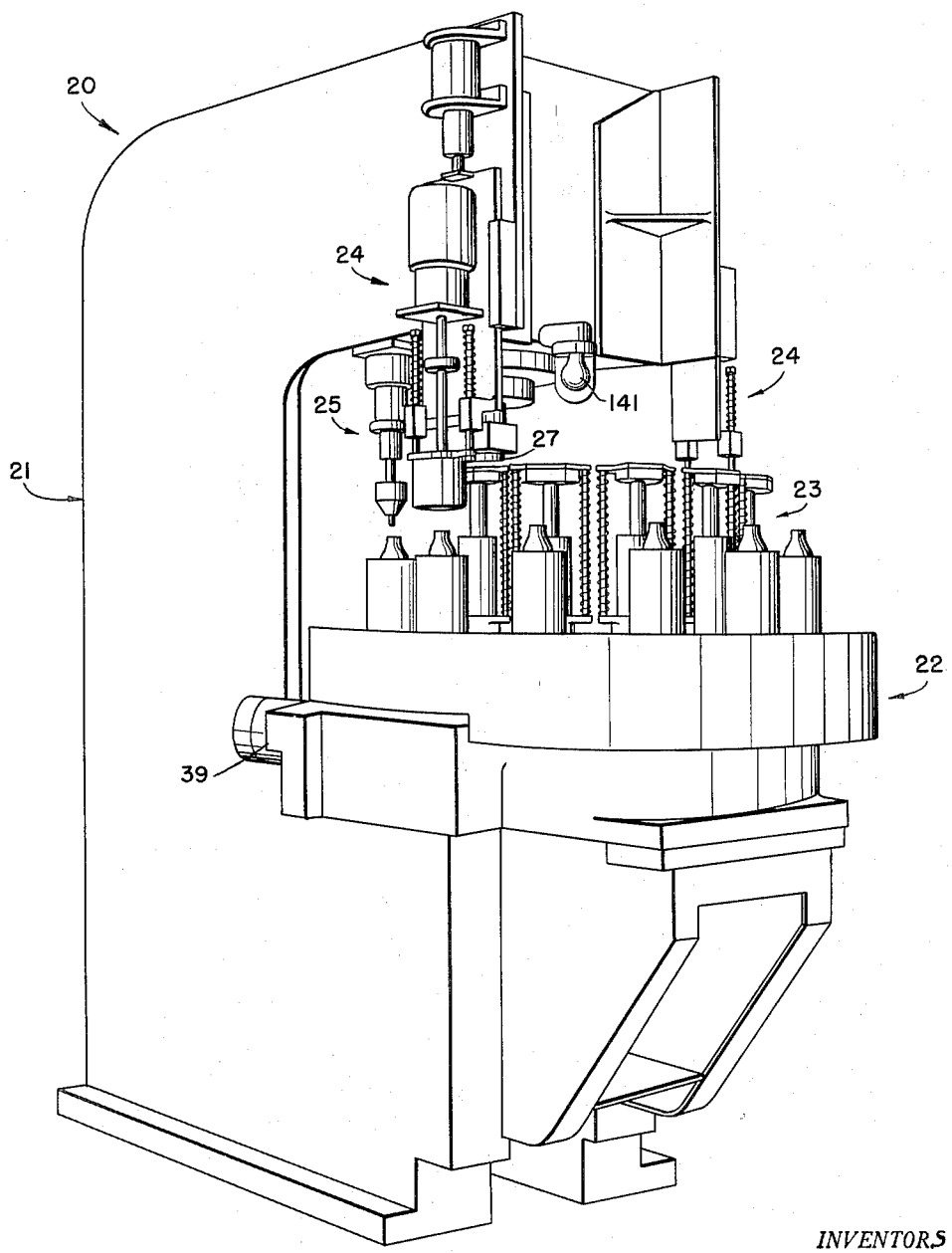
Fig. 1 is a perspective view of testing apparatus formed in accordance with the present invention.

Referring more particularly to the drawings, the numeral 20 designates the apparatus for hydrostatically testing rocket bodies in its entirety. This machine or apparatus includes generally a hydraulic press 21 and an index table 22, the latter having body holding and testing apparatus provided thereon at a plurality of spaced stations. The holding and testing mechanism is indicated generally by the numeral 23. The apparatus is also provided with means, indicated generally by the numeral 24, for engaging and rotating the blanks to be tested to threadedly secure these blanks in substantially fluid tight relationship on holders forming part of the mechanism 23. Also the apparatus is provided with another means, indicated generally by the numeral 25, for filling the container bodies with oil or other testing fluid after such bodies have been secured to the holders. In addition the apparatus is provided with means, indicated by the numeral 26, for marking the container bodies after they have been tested and found satisfactory. The general operation of the apparatus is as follows:

The rocket bodies to be tested are initially applied to the holders manually by one or more operators when the index table is at rest between intermittent movements thereof. The holder with the body initially applied thereto is then advanced by the index table to the mechanism 24 which is shown in detail in Figs. 7 and 8 and this mechanism automatically connects a rotary motor to the container body and rotates the latter to cause it to be secured by threads to the adaptor in substantially fluid tight relationship. This operation also takes place while the table is at rest between steps of movement thereof.

At the next station the rocket body, previously applied to the holder, registers with the means 25 employed to fill the rocket body with oil or other testing fluid. This filling mechanism is shown in detail in Figs. 9, 10 and 11. This means includes a filling nozzle which is valve-controlled, the mechanism serving to open the seal at one end of rocket body so that the testing fluid can be introduced into the body.

At the next station of rest of the index table the holding and testing mechanism 23 registers with the ram 27 of the hydraulic press which moves to actuate the testing mechanism to apply an intensified pressure on the fluid contained within the rocket body. When the test has been successfully concluded, the mechanism 26 is operated to apply a suitable mark to the exterior of the rocket body to show that it has been approved.

Following the next stage of movement of the index table, the rocket body is again engaged by a mechanism similar to mechanism 24 which causes the rocket body to rotate in a direction to unscrew the body from the holder so that at a subsequent stage of operation of the table the body can be removed for further processing.

The hydraulic press and index table employed in the apparatus shown in Fig. 1 is of the type shown and described in Patent No. 2,512,731 granted to Cecil E. Adams on June 27, 1950. This press includes a hydraulic cylinder 28 for actuating the ram 27, this cylinder containing a piston 30 from which the ram 27 depends. The movement of the ram is controlled by a valve mechanism indicated generally by the numeral 31. To provide fluid under pressure for operating the power cylinder 28, there has been provided a fluid pressure source including a fluid pump 32, a reservoir 33 from which the pump draws fluid through line 34, a relief valve 35 and fluid lines 36 between the pump and relief valve 37 and between the latter and the control valve 31. The valve 31 is of an automatic type similar to that shown in the Patent No. 2,561,766 granted to Cecil E. Adams on July 24, 1951, and operates to alternately direct fluid from the pump 32 to the opposite ends of the power cylinder 28 to effect the reciprocation of the piston 30. This valve also operates between strokes of the piston 30 to direct fluid under pressure to the control valve mechanism 38 of a fluid motor 39 used to intermittently move the index table 22 so that the stations thereon will be successively registered with the ram 27. Fluid lines 40 and 41 extend between the valve 31 and the control mechanism for the table driving motor 39, this mechanism being shown in detail in the patent referred to above. The press and index table have been shown and described in detail in the patent mentioned and since they form, per se, no part of the invention here, further description of their construction will be omitted. It is sufficient to state that the mechanism operates to cause a cycle including the advance and retraction of the ram, then one increment of movement of the index table while the ram is maintained stationary in its retracted position. The increment of movement of the index table is followed by another advance and retractive movement of the ram then the table moves another increment. These operations are continued automatically until valve 31 is actuated by the manipulation of a control 42, or other means, to interrupt this automatic ram and table operation.

Figure 5:
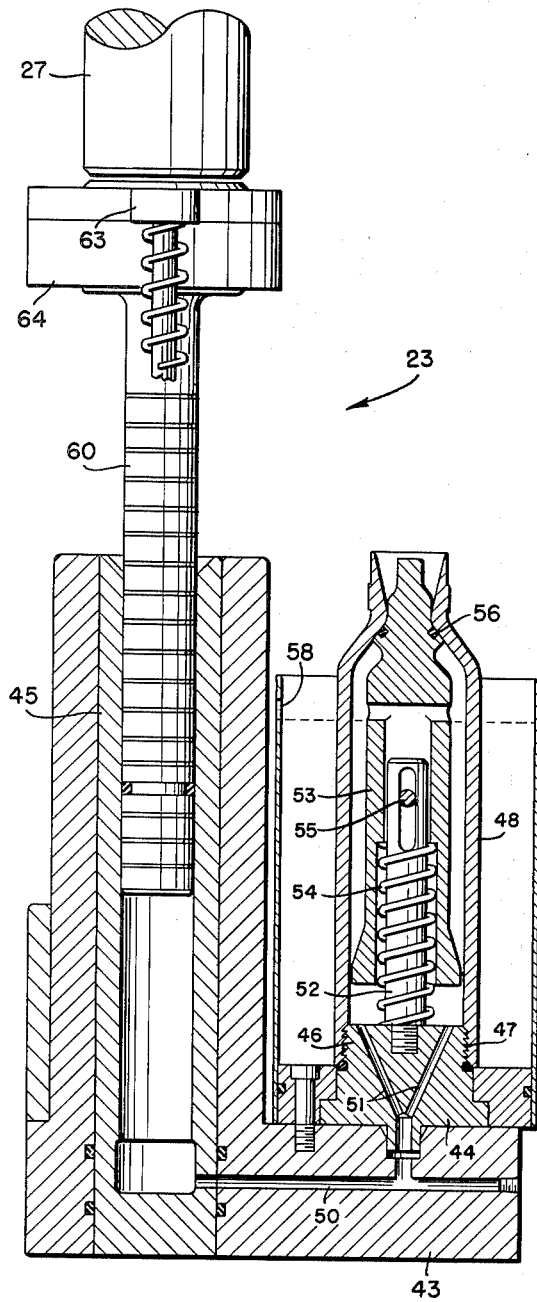
Fig. 5 is a detail vertical sectional view taken through a holding and testing mechanism used in the apparatus shown in Fig. 1.
Figure 6:
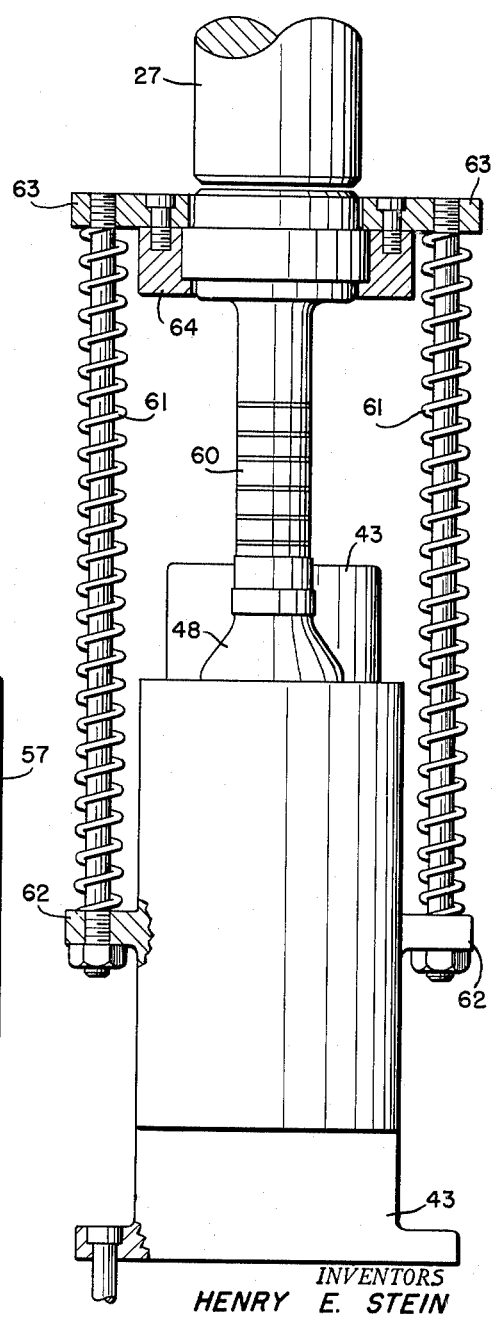
Fig. 6 is a front elevational view of the holding and testing mechanism shown in Fig. 5.

As mentioned previously, the index table is provided at spaced stations thereon with a rocket body holding and testing mechanism indicated by the numeral 23. This holding and testing mechanism is best illustrated in Figs. 5 and 6. It includes a base member 43 which is suitably secured to the table and supports an adaptor 44 for the rocket body and a cylinder 45 which forms a part of the testing mechanism. The adaptor has an upwardly projecting portion 46 which is provided with screw threads 47, these being formed for the reception of similar screw threads provided in one of the open ends of a rocket body 48. The cylinder 45 communicates through passages 50 and 51 with the interior of a rocket body when it is in place on the adaptor 44, the passages 51 being formed in the upwardly projecting portion 46 of the adaptor. This upwardly projecting portion is also provided with an upwardly extending post 52 which supports, for vertical sliding movement, a member 53, this member being urged in an upward direction by a coil spring 54 disposed in a socket in the member 53 and surrounding the post 52. A pin 55 carried by the member 53, limits the vertical movement of the member 53, this pin extending through a slot formed in post 52. The upper end of the member 53 has a recess in which an annular rubber or other sealing gasket 56 is disposed, this gasket engaging the converging wall of the rocket body 48 and closing the other open end of the body when it is positioned on the holder. A portion of the member 53 projects upwardly through or into the end of the body 48. The purpose of this extension will be apparent from the following description. The holder is provided also with an open-topped receptacle 57 which in the normal operation of the apparatus is filled with testing fluid to the level determined by an opening 58 in the side wall. This body of fluid assists in filling the rocket bodies since it minimizes the amount of fluid necessary to complete the filling thereof after the body has been applied to the adaptor. The cylinder 45 receives a plunger 60 through the operation of which fluid is forced from the cylinder through the passages 50 and 51 into the container body. This action takes place when the plunger 60 is depressed. The plunger is normally urged in an outward direction by a pair of coil springs 61 disposed between lugs 62 on the base 43 and flanges 63 forming part of a carrier 64 for the plunger 60.

When the body holding and testing mechanism is disposed in registration with the ram, the plunger 60 will be located in alignment with the ram so that movement of the latter will be directly imparted to the plunger. Due to the difference in size, which has been carefully calculated, between the piston 30 of the power cylinder 28 and the plunger 60, a predetermined intensification of pressure will be secured. It has been found that pressures on the order of 25,000 p. s. i. are desirable in testing certain types of rocket bodies. The ratio of areas of the piston 30 and plunger 60 may be calculated to secure the desired pressure in the rocket body without the employment of excessive pressures in the power cylinder 28. It will be obvious that, to properly test the bodies, it will be necessary to securely apply them to the adaptors 44. In order to accomplish this attachment in a rapid manner, the mechanism shown in Figs. 7 and 8 and indicated generally by the numeral 24 has been provided.

This mechanism includes a fluid motor 66 which is mounted for vertical sliding movement as at 67 on the side of the press frame. This fluid motor is connected for movement by an air cylinder 68, this air cylinder having a piston 70, shown in the diagrammatic view in Fig. 3, and a stem 71 by which the piston is connected to the mounting for the fluid motor 66. The shaft 72 of the fluid motor is connected by a coupling 73 with the shaft 74 of a rotary chucking device indicated generally by the numeral 75. This chucking device is employed to separably connect the rocket body 48 to the fluid motor 66 so that rotary movement may be imparted to the body to thread the same onto the adaptor 44 of the holding mechanism. When the body is applied to the holding mechanism, it is initially threaded onto the adaptor about one-half a turn; when it is advanced into registration with the mechanism 24, it is then connected by the chucking mechanism with the fluid motor and the threading of the body onto the adaptor is completed.

The chucking mechanism 75 includes a casing 76 which forms a chamber 77 for the reception of the various parts of the chuck. This chuck includes a spring collet 78 having jaws 80 at its lower end for engaging and holding the upper end of the rocket body. The member 78 extends completely through the casing 76 and is keyed as at 81 to the shaft 74 so that it will rotate in unison with this shaft. The lower ends 80 of the collet flare outwardly as at 82 and are engaged by a sleeve-like actuating piston 83, this sleeve having a tapered surface for engaging the flare 82. The sleeve 83 is enlarged at its upper end to provide a piston head 84, this head being coupled for rotation to a similar head 85 by one or more pins 86. The head 85 is provided with one race 87 of anti-friction bearing 88, the other race of which is carried by the body 76. The body is provided at opposite ends with seals 90 to prevent the escape of fluid around the sleeve 83 and a second sleeve 91 formed in connection with the head 85. Suitable drain grooves 92 are provided in the body adjacent the seals 90, these grooves being connected with an exhaust passage so that the seals 90 will not be subjected to undue fluid pressure.

It will be obvious from the foregoing description that, when shaft 74 is revolved, the collet 80, sleeves 83 and 91 and heads 84 and 85 will also be revolved. The head is resiliently suspended through the provision of guide rods 93 which are connected to ears 94 formed on the body 76 and extending through lugs 95 formed on the mounting for the fluid motor 66. Coil springs 96 surround these rods and are disposed between the lugs 95 and heads 97 on the rods. These springs resiliently support the chucking mechanism yet permit relative movement to take place between the chucking mechanism and the fluid motor 66 when the chucking mechanism engages a rocket body.

Figure 8:
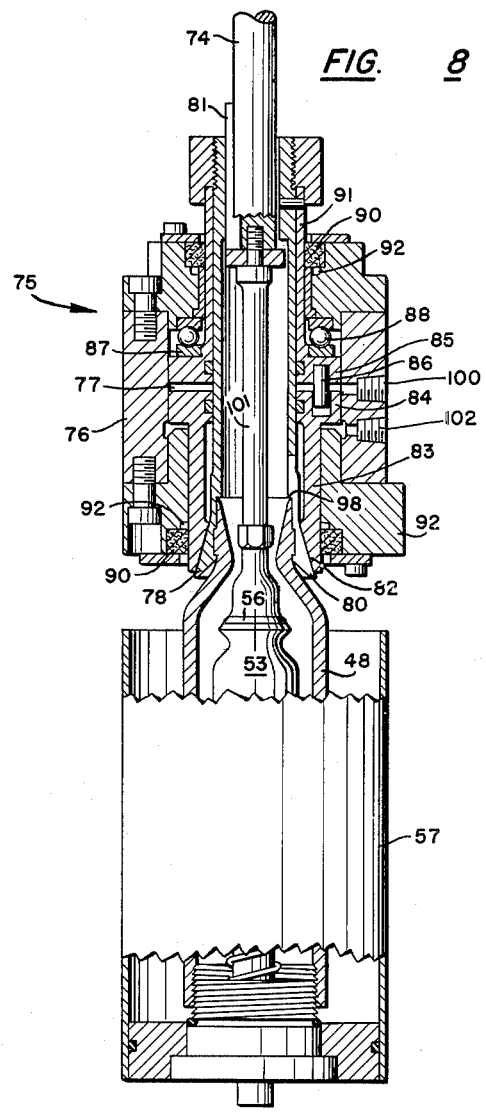
Fig. 8 is a detail vertical sectional view taken through a portion of the mechanism shown in Fig. 7, the plane of this section being indicated by the line VIII—VIII.

Fig. 8 shows a rocket body operatively positioned in the chucking mechanism. The upper end of this rocket body engages a shoulder 98 formed in the collet 78, thus limiting the distance the body will move into the chucking mechanism. After the body has been so positioned, the fluid pressure will be introduced through a port 100 to the space between the heads 84 and 85. This fluid pressure will urge head 84 in a downward direction causing sleeve 83 to move downward relative to the collet 80, this collet being held in its uppermost position by the fluid pressure applied to the head 85 directly connected therewith. As the sleeve 83 moves downwardly, the tapered opening at its lower end cooperates with the flared portion 82 of the collet causing the collet jaws to grip the upper portion of the body 48. When the body is so gripped, it will be rigidly connected with the fluid motor 66 and rotary movement imparted to the motor shaft will cause similar movement of the body.

To prevent the annular gasket 56 from being worn or prematurely destroyed during the rotary movement of the body, the shaft 74 is provided with an extension 101 which projects through the collet and engages the upper end of the member 53 on the holder. As previously mentioned, this member 53 is spring pressed in an upward direction and, when it is engaged by the extension 101, may be depressed until the gasket 56 is removed from engagement with the innerside of the body 48. When the body 48 has been firmly secured to the adaptor, further rotation of the body will be precluded. At this time fluid under pressure will be supplied to port 102 while port 100 will be connected with exhaust. The fluid flowing through port 102 will be applied to the underside of head 84 causing this head to move in an upward direction permitting the collet 80 to expand and release its grip on the body 48. At this time also air cylinder 68 will be operated to withdraw the chucking mechanism from the body so that the body may then be moved to the next station where the container or body may be filled with testing fluid.

The mechanism for filling the rocket body with testing fluid has been illustrated in Figs. 9 to 11 inclusive. This mechanism includes a nozzle 103 which is carried by the lower end of a piston rod 104. This piston rod projects from an air cylinder 105 which contains a piston 106 shown in the diagrammatic view in Fig. 3. The nozzle 103 communicates by line 107 with a suitable source of oil or other testing fluid under pressure. This source is indicated by the numeral 108 and includes a reservoir 110, a pump 111 and relief valve 112. Line 107 receives a fluid from the pump, the relief valve 112 serving to limit the pressure on this fluid. This pressure is rather light since it is only necessary to cause the fluid to flow into the open end of the rocket body against slight opposition. The nozzle 103 is closed under normal conditions by a poppet valve 113 which has a stem 114 extending therefrom. The poppet is urged to a closed position by a coil spring 115, this spring being compressed when the stem 114 is engaged with the upper end of the member 53 disposed within the rocket body 48 during the downward movement of the nozzle 103. Continued movement of the nozzle causes the poppet valve to engage a projection 116 in the nozzle and movement of rod 104 is then transmitted directly to the member 53 to move it downwardly against the force of spring 54 causing the gasket 56 to be spaced from the body wall and permit testing fluid to enter the body. When the testing fluid flows into the body, all air previously disposed therein will be exhausted and the body completely filled with fluid. After this operation has been completed, the air cylinder 105 will retract the piston rod 104 causing the nozzle 103 to move away from the rocket body. This movement will permit poppet valve 113 to close and prevent further escape of testing fluid.

When the rocket body has been filled with testing fluid, the table is indexed to move the filled body into testing position adjacent the ram 27. As previously mentioned, the plunger 60 of the testing mechanism will then be in alignment with the ram 27 and, when the ram is advanced, this plunger will be moved into cylinder 45 to cause the hydrostatic pressure to increase in the rocket body. The control valve 31 for the hydraulic cylinder 28 is so constructed that, when the ram ceases to advance, the direction of fluid flow to the power cylinder will be reversed and the ram will be retracted. This feature of operation is inherent in the valve 31 as defined in the patent previously referred to. After the body has been subjected to the hydrostatic test for a predetermined length of time and has successfully withstood such test, the body will be marked by the marking mechanism indicated generally by the numeral 26.

Figure 7:
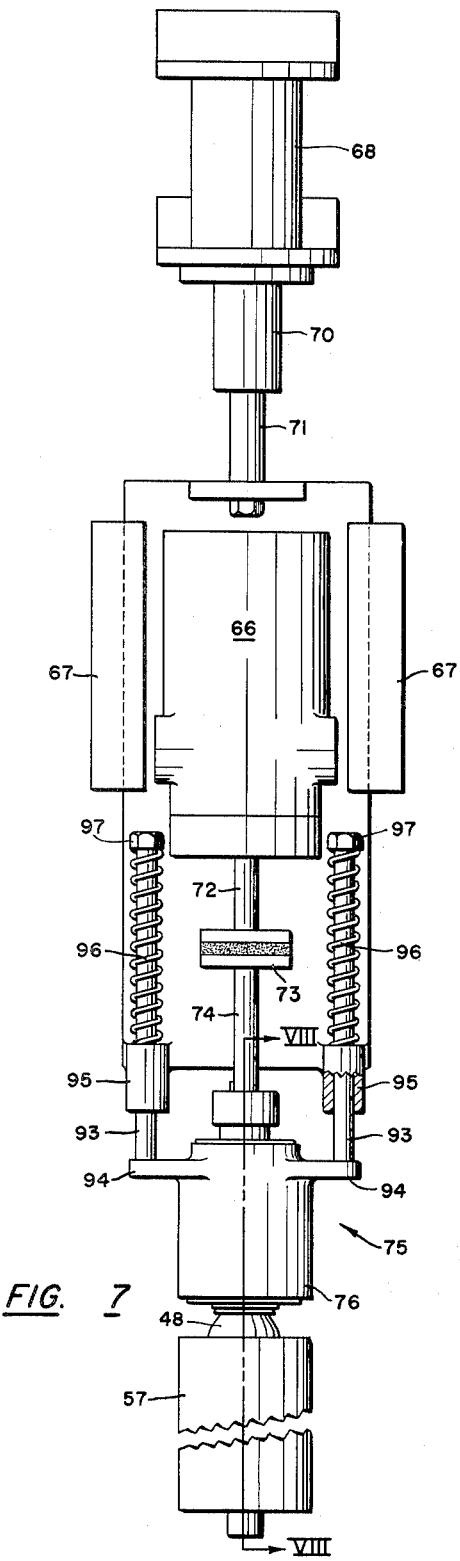
Fig. 7 is a front elevational view of a mechanism employed to rotate the container bodies to threadedly secure the same on the holders shown in Fig. 5.

This mechanism includes a plunger 117 which is provided at its forward end with a suitable marking die 118. The plunger is guided for movement toward and away from a rocket body when it is disposed adjacent the ram. The plunger 117 is normally urged toward the rocket body by a coil spring 120 which surrounds the plunger and is enclosed in a suitable housing 121. The rocket body 48 is prevented from moving when engaged by the plunger 117 by a back-up bar 122 which is disposed for sliding movement on guide pins 123 projecting downwardly from a bracket 124 carried by the press frame. The bar 122 is urged in a downward direction toward operative position by coil springs 125 contained within thimble members 126, these coil springs being disposed between the bar 124 and shoulders formed in the thimble members, the latter being carried by the bar 122. When the ram is in its elevated position, the bar 122 will be held in an inoperative position by a headed rod 127 secured for movement with the ram. This bar projects through the supporting bar 122 and has a head 127A which moves the bar in opposition to the springs 125 when the ram retracts. Also movable with the ram are a plurality of cam members 128 which are suspended from an arm carried by the ram. The inclined surfaces on the members 128 cooperate with a pair of ears 130 projecting laterally from the plunger 117 as the ram retracts. The cam surfaces move the plunger 117 in opposition to the spring 120 until a latch member 131 engages the plunger to hold it in its retracted position. This latch is yieldably held in operative position by a coil spring 132. The latch is released by a solenoid operated plunger 133 to permit the plunger to move the marking dies 118 firmly into engagement with the rocket body. This marking takes place when the ram is extended and immediately follows the application of fluid pressure to the rocket body. After the body is so marked and the ram is retracted, the table is indexed to move the holding and testing mechanism to a succeeding station at which a mechanism similar to that shown in Fig. 7 is provided. This mechanism includes all of the elements shown in Fig. 7 and generally designated by the numeral 24 but the fluid motor 66 is arranged to operate in a reverse direction. The chucking mechanism operates in the same manner to connect the rocket body to the fluid motor so that reverse rotation of the shaft of this member causes similar movement of the rocket body to unthread it from the adaptor 44. The unthreading operation is interrupted just prior to the separation of the rocket body from the adaptor. It is completed manually by the operator when removing the rocket body from the testing apparatus.

Figure 2:
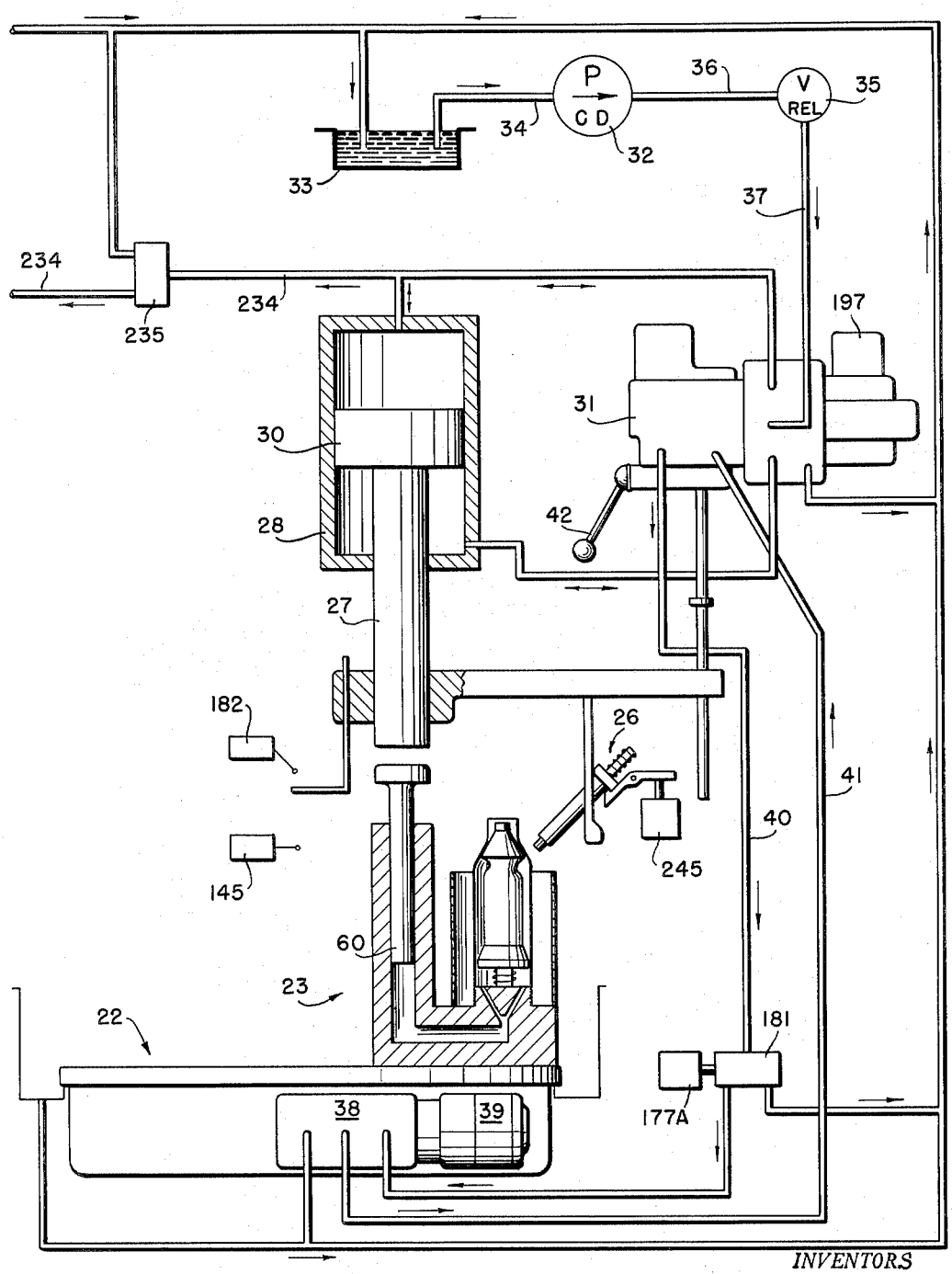
Fig. 2 is a diagrammatic view of the main hydraulic system employed in the apparatus shown in Fig. 1.
Figure 3:
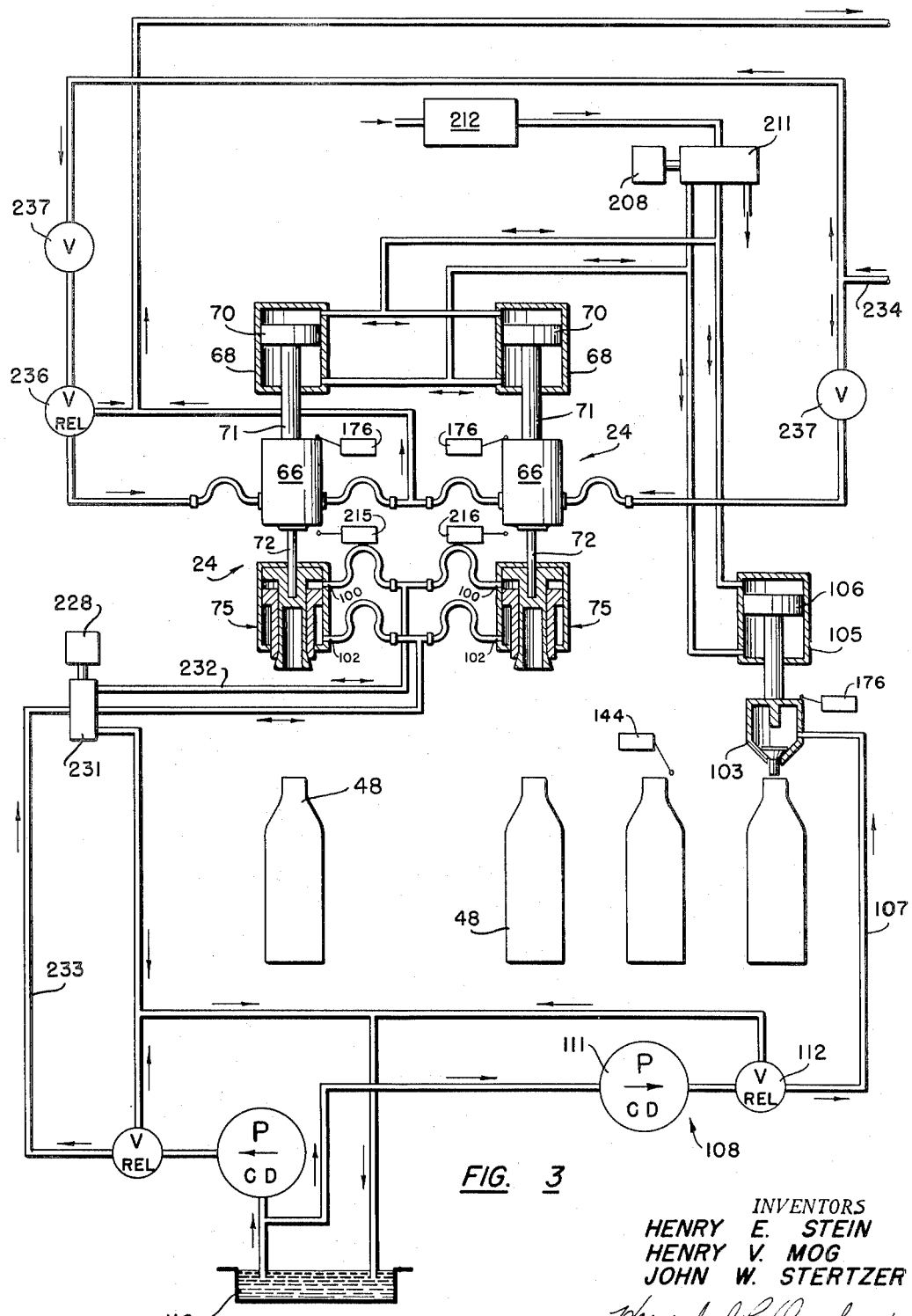
Fig. 3 is a similar view of a secondary hydraulic apparatus employed in the machine, this view also containing a diagrammatic illustration of an air system employed in the machine.
Figure 4:
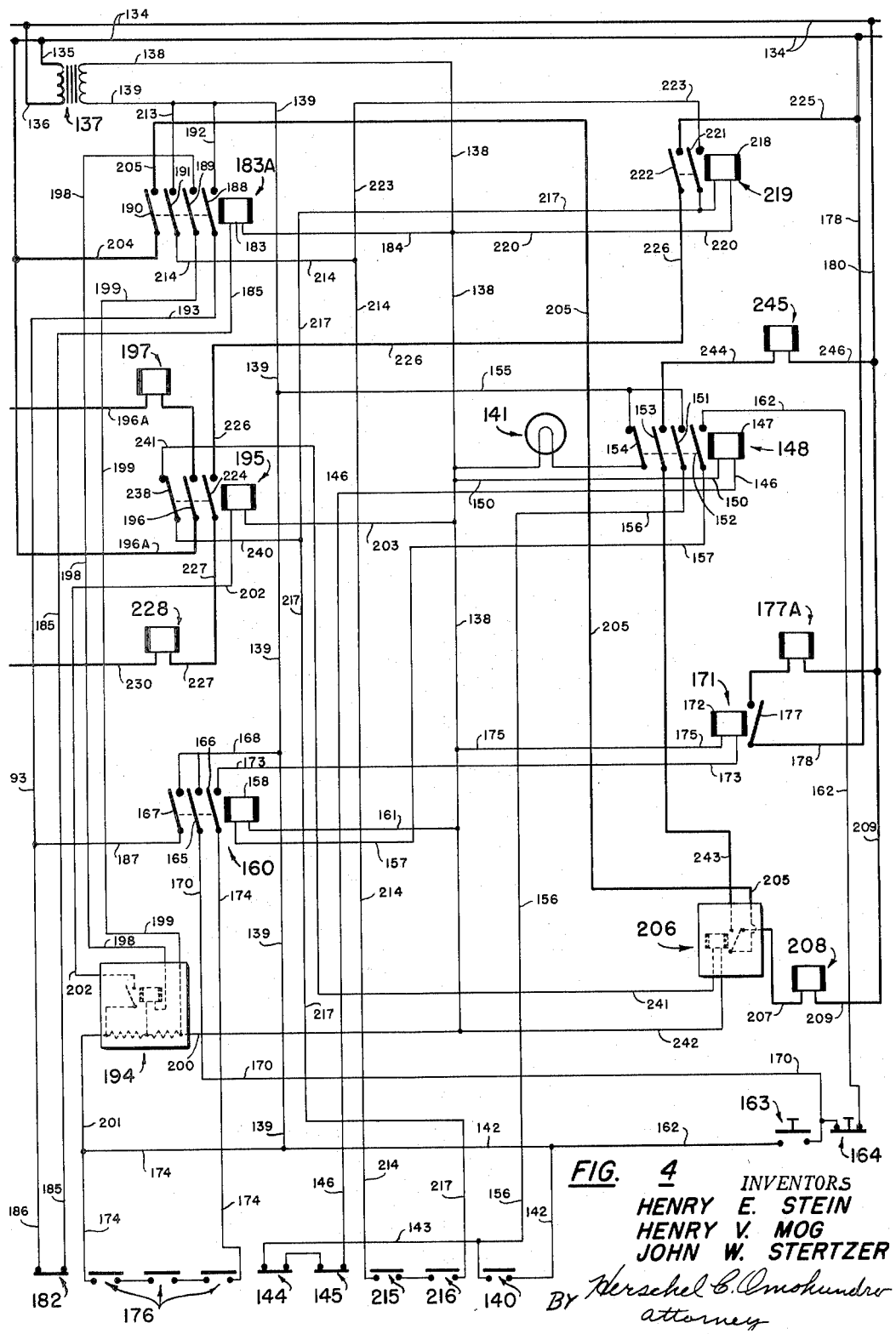
Fig. 4 is a diagrammatic view of an electrical control shown in Fig. 1.

All of the various mechanisms making up this hydrostatic apparatus are tied together electrically to make the operation of the machine completely automatic after the rocket bodies are applied to the holders, the only manual operation in addition to this one being the actuation of the control 42 which initiates the operation of the hydraulic portions of the machine. The electrical circuit for the machine is shown diagrammatically in Fig. 4. This electrical circuit includes a plurality of relays, timers, solenoids and switches. Some of these elements are disclosed in the diagrammatic views of the various sections of the hydraulic system and the compressed air system shown in Figs. 2 and 3. Similar reference characters will identify these parts in the electrical and hydraulic diagrams in Figs. 2, 3 and 4. Numeral 134 designates the main electrical lines or other suitable source of electrical energy. Conductors 135 and 136 extend from these lines to the primary side of a transformer 137 and the secondary of this transformer has conductors 138 and 139 extending therefrom. Before the operation of the machine is initiated, it is necessary that a key switch 140 be operated. This key switch may be operated only by one in authority having a suitable key. This type of switch is provided so that during the testing operations of the machine one person, generally designated as an inspector, will have complete control of the operations and, if a rocket body proves unsatisfactory, a warning signal 141, in the form of an electric lamp, will be energized to call the inspector's attention to the failure. This warning signal is accompanied by the interruption of the operation of the machine and such operations can only be resumed through the actuation of the key switch 140. The parts and the manner of operation to secure this safety feature will be made apparent by the description of the electrical circuit which follows:

Switch 140 is connected by line 142 to the lead 139 extending from one side of the secondary of the transformer 137. When switch 140 is closed, current will flow from the lead line 139 through conductor 142 and switch 140 to line 143 to serially connected switches 144 and 145. These switches are commonly termed limit switches and are normally closed. Limit switch 144, as shown in Fig. 3, is located adjacent the path of travel of the rocket bodies and is so disposed that, if a body is not properly positioned on its holder, the switch will be actuated to interrupt the operation of the machine. The operator will then be required to remedy the difficulty by correctly positioning the rocket body on the holder. Under normal conditions, however, switch 144 remains closed. Switch 145 is disposed, as shown in Fig. 2, so that it will be operated in the event that ram 27 moves an excessive distance in the testing operation of the rockets. If a rocket should prove unsuitable or defective, the ram will move an excessive distance and operate or move switch 145 to an open position which will also interrupt the operation of the machine. The machine will remain inoperative, as previously pointed out, until the defective rocket body is removed and the machine placed in operation through the use of the key operated switch 140. Switch 145 is connected by line 146 with the field coil 147 of a relay, generally designated by the numeral 148. This coil 147 is connected by line 150 with line 138 extending from the other side of the secondary of the transformer 137. It will be obvious that, when the key switch 140 is operated, the branch circuit for the relay 148 will be closed and field coil 147 will be energized. The activation of coil 147 serves to move a plurality of switches 151 to 154 inclusive. Switches 151, 152 and 153 are moved to closed positions; switch 154 is moved to an open position. The reason for this operation of switch 154 will be set forth later.

Switch 151 is provided to control what may be termed a holding circuit for the relay 148. It is connected by line 155 with line 139 which leads to the secondary of transformer 137. The switch 151 is also connected by line 156 with line 143, switches 144 and 145 and line 146 with the coil 147 of relay 148. This coil is connected, as mentioned, by line 150 with the secondary of the transformer. It will be obvious that, when switch 151 is closed, coil 147 will remain energized holding switches 151, 152 and 153 in closed positions. Through the provision of the holding circuit, key switch 140 will only be required to be closed for an instant then it may be opened again, relay 148 then remaining energized through the holding circuit.

Switch 152 is connected by line 157 with one side of field coil 158 of a second relay 160. This coil is also connected by line 161 with line 138 which leads to the secondary of the transformer. Switch 152 of relay 148 is also connected by line 162 with line 142 which is in turn connected with line 139 which leads to the secondary of the transformer 137. Line 162 contains a pair of switches 163 and 164, the latter being normally closed and constituting a safety or stop switch. Switch 163 is a normally open switch and and constitutes a starting switch. After the key switch has been operated to energize relay switch 148 which will close switch 152, the closing of switch 163 will then operate to energize the coil 158 of a second relay 160. When coil 158 is excited, switches 165 to 167, inclusive, will be closed. Switch 165 controls the holding circuit branch for field coil 158 of relay 160. After switch 165 has been closed through the manual operation of the starting switch 163, the field coil 158 will remain energized even though the starting switch is released. Switch 165 is connected by lead 168 with line 139 extending from the transformer, the switch also being connected to a line 170 which is shunted around the starting switch. This line 170 is connected with one side of stop switch 164, this switch being, as previously pointed out, connected by line 162, switch 152 and line 157 with the field coil 158 of the relay 160. Also, as pointed out above, the field coil 158 is connected with transformer lead 138 by line 161. It will be obvious that, after field coil 158 has been initially energized, by momentarily closing switch 163, and has closed switch 165, the circuit will remain closed until it is broken either by manually opening the stop switch 164 or by the opening of switch 152 through the de-energizing of coil 147. When coil 158 is energized, switch 166 will also be closed to complete a circuit for a relay indicated by the numeral 171. This relay contains a field coil 172 which is connected by a line 173 with one side of switch 166, the other side of this switch being connected by a line 174 with line 139 which leads to one side of the transformer 137. Field coil 172 is connected with the other side of this transformer by line 175 which is connected with lead 138.

Line 174 contains a plurality, in this instance three, limit switches 176 which, as shown in Fig. 3, are disposed in positions to be held closed when the pistons 70 and 106 of air cylinders 68 and 105 are retracted. These switches are normally open switches but, due to the actuation thereof when the pistons 70 and 106 are retracted to place the body attaching and detaching and filling mechanism in inoperative position, are held closed. Thus, when switch 166 of relay 160 is closed, coil 172 will be energized and will close switch 177. This switch controls a circuit branch containing a solenoid 177A which is connected to receive current directly from the main lines 134 through leads 178 and 180. This solenoid 177A operates a valve 181 in the fluid line 40, see Fig. 2, leading from the control valve 31 to the control mechanism 38 for the index table motor. When switch 176 is closed, solenoid 177A is energized to move the valve 181 to an open position. The opening of this valve merely places the line 40 in condition to conduct fluid to the control mechanism 38 when valve 31 is properly disposed to connect this line with the source of fluid pressure.

Following the operation of the push button switch 163, the automatic operation of the testing apparatus may be initiated through the manipulation of the control 42, see Fig. 2. This control places valve 31 in condition to cause automatically repeated cycles of operation and fluid will first be directed through line 40 to the control mechanism for the indexing table motor. At this time this control mechanism will be in condition to cause the index table to move one increment of travel or, as termed in the industry, advance one station. Following this movement, fluid will be directed from the mechanism 38 through line 41 to the valve 31 to actuate a fluid pressure responsive member in the valve 31 to cause the power cylinder 28 to perform one cycle of operation.

It may be stated at this time that, before automatic operation can take place, the machine must be "set up," that is, the stations on the index table in registration with the ram and in advance thereof must be loaded or supplied with rocket bodies. This operation is accomplished by the operator who initially threads a rocket body about a half a turn onto a holder in advance of the mechanism 24, then manipulates the control 42. The table will advance one station placing the rocket body in registration with the mechanism 24 which will then complete the threading of the body onto the holder as previously explained. Since the ram, the filling mechanism and the body threading and unthreading mechanism all operate substantially simultaneously, the ram due to the absence of a body at the station in registration therewith will move switch 145 to an open position to break the circuit for relay 148 and interrupt the operation of the machine, also as previously explained. The key switch 140 and starting switch 163 will have to be actuated each time the table advances until a rocket body is disposed in registration with the ram and prevents it from moving far enough to open switch 145. The apparatus will then be "set up" for the automatic repetition of the testing operation in which the ram cycles automatically.

In the cycle of operation of the ram 27, it will be extended to actuate piston 60 of the testing mechanism in registration therewith. When the ram commences to advance, limit switch 182 which, as shown in Fig. 2, is located adjacent the ram and is held open when the ram is fully retracted, will be permitted to move to a closed position and complete the circuit branch containing the field coil 183 of a relay 183A. Field coil 183 is connected with the transformer lead 138 by conductor 184 and with switch 182 by line 185. Switch 182 is in turn connected by conductors 186 and 187 with the switch 167 of relay 160, this switch being connected with transformer lead 139 by line 168. It will be apparent that the initial advancement of ram 27 will close switch 182 and energize coil 183 of relay 183A. When the coil is so energized, switches 188 to 191, inclusive, will be moved to closed positions. Switch 188 is arranged in series with switch 182 and is provided to maintain the circuit for coil 183 closed even though switch 167 may be opened. This switch would be opened if the stop switch 164 were actuated to interrupt the operation of the apparatus. When switch 164 is so actuated, switch 188 of relay 183A maintains the circuit for the relay 183A closed until the ram has completed its cycle and broken the circuit by opening the limit switch 182. Switch 188 is connected with transformer lead 139 by wire 192 and with lead 186 by lead 193.

It is desirable, in the testing operation, to maintain the hydrostatic pressure for a predetermined length of time on the body being tested. This object is accomplished by providing the control valve mechanism 31 with an electronic time delay means 194 which controls a relay 195 having a switch 196 for governing the circuit 196A for a solenoid 197 associated with the valve mechanism 31. When the solenoid 197 is energized, it will maintain the mechanism 31 in condition to direct fluid to the upper end of the power cylinder 28 which will hold the ram in an extended or pressure exerting position. Timer 194 is set in operation when the circuit to relay 183A is energized and switch 189 is closed. Switch 189 is connected with the timer 194 by lines 198 and 199. Timer 194 is connected with transformer lead 138 by line 200 and with transformer lead 139 by wire 201 and part of line 174. When the timer 194 times out, current flow through line 202 to relay 195 will be interrupted and switch 196 will open breaking the circuit containing solenoid 197. At this time the ram will be permitted to return to its retracted position. The circuit for relay 195 includes wire 203 which is connected with transformer lead 138.

When initial downward movement of the ram permits switch 182 to close and energize relay 183A, switch 190 will be closed. This switch is arranged in a circuit including line 204, which extends from one of the main power lines 134; line 205, which leads to a second timing mechanism 206 where it is normally connected with line 207, a solenoid 208 and line 209 leading to the other main power line 134. The closing of switch 190 energizes solenoid 208 which, as shown in Fig. 3, serves to actuate a valve 211 disposed to control the flow of compressed air from the source 212 to the power cylinders 68 and 105 to effect movement of the chucking mechanisms 75 and filling nozzle 103 toward the rocket bodies. When movement of the mechanisms 75 and 103 is initiated, switches 176 will open breaking the circuit for relay 171 and opening switch 177. This action will interrupt current flow to solenoid 177A and permit valve 181 to shift to cause fluid flowing through line 40 to be diverted to exhaust. The diversion of the fluid in this manner insures the retention of the index table against rotation while the test is being performed.

When relay 183A is energized, switch 191 will also be closed; this switch is arranged in a circuit branch containing line 213 leading from transformer lead 139, line 214, switches 215 and 216, line 217, coil 218 of relay 219 and line 220 which connects with transformer lead 138. The switches 215 and 216 are normally open but are located, as shown in Fig. 3, in positions to be closed when the air powered cylinders 68 have moved the rocket body threading and unthreading mechanisms into operative positions. When these switches are closed, while switch 181 is closed, the circuit for relay 219 will be energized and switches 221 and 222 will be closed. Switch 221 is connected by lines 223 and 214 with switch 191 and cooperates with this switch to provide a holding circuit for the relay 219 permitting this relay to remain energized even though one or the other of switches 215 and 216 should be opened.

Switch 222 is arranged in series with switch 224 in a circuit including line 225, extending from one of the main lines 134, line 226 extending between switches 222 and 224, line 227, a solenoid 228 and line 230 extending to the other main line 134. Solenoid 228 serves to actuate a valve 231 which controls the flow of fluid pressure to actuate the hydraulic chucks 75. When the switches 222 and 224 are both closed, solenoid 228 will be energized and will shift valve 231 to a position to connect ports 100 with a source of fluid pressure via lines 232 and 233. This valve also connects ports 102 with exhaust at the same time so that the fluid pressure will cause the chucks to engage and connect the rocket bodies with the fluid motors.

It will be obvious that the air cylinders will be energized to move the chucks then the latter will be energized to connect the bodies with the motors 66 after which fluid will be supplied to the motors to effect the rotation of the bodies. This fluid is supplied through a line 234 connected with the top of the ram cylinder 28. The line 234 contains a sequence valve 235 which, after the pressure in the cylinder 28 reaches a predetermined value, will permit fluid flow through line 234 to the fluid motors 66 to cause them to rotate the bodies connected therewith. Line 234 contains a relief valve 236 to limit the fluid pressure applied to the motors 66 and hence the force exerted thereby, and suitable flow regulating means 237 to determine the rate of rotation thereof.

When the time for which timer 194 has previously been set expires, current flow to relay 195 will be interrupted permitting switches 196 and 224 to open and break the circuits for solenoids 197 and 228. The de-energizing of solenoid 197 permits valve 31 to interrupt fluid flow to the upper end of ram cylinder 28 and through line 234 to motors 66. The forces tending to effect the rotation of the rocket bodies will be discontinued. The de-energizing of solenoid 228 permits valve 231 to shift to reverse the inlet and exhaust connections for the chucking mechanisms 75. This reversal causes the chucks to release the rocket bodies.

The de-energizing of relay 195 also permits a third switch 238 controlled thereby to close. This switch 238 is connected by line 240 with line 217 which is connected with transformer lead 139 through switches 216 and 215, line 214, switch 191 and line 213. Switch 238 is also connected by line 241 with the timer 206 which is in turn connected by line 242 with transformer lead 138. When switch 238 closes, operation of timer 206 will be initiated and, when the time for which it has been set has expired, the connection between lines 205 and 207 will be broken and current flow to solenoid 208 will be interrupted. The de-energizing of solenoid 208 will permit valve 211 to reverse the inlet and exhaust connections for the air power cylinders 68 and 105 which causes these cylinders to effect the movement of the chucks 75 and filling nozzle 103 away from the rocket bodies. When the connection between lines 205 and 207 in timer 206 is broken, a connection between line 205 and a line 243 is established. Line 243 leads to switch 153 of relay 148 which switch is connected by line 244 with a solenoid 245 which is connected by lines 246 and 180 with one of the main power lines 134. When lines 205 and 243 are connected, current will flow through line 204, switch 190, line 205, line 243, switch 153, line 244, solenoid 245 and lines 246 and 180. When a solenoid 245 is thus energized, it will move rod 133 (see Fig. 12) to shift latch 131 and release plunger 117. This plunger will move under spring force toward the rocket body in registration with the ram causing die 118 to stamp the body.

Just prior to the time the ram reaches its fully retracted position, it will engage and open switch 182 and thus interrupt current flow to relay 183A. When this relay is de-energized, current flow to solenoid 245 will be interrupted through the opening of switch 190 and latch 131 will then be moved by spring 132 to a position to retain plunger 117 retracted, to which position it will have been moved by the retraction of the ram, as previously explained. De-energizing of relay 183A also permits switches 188, 189 and 191 to open. When switch 191 opens relay 219 will be de-energized permitting switches 221 and 222 to open. The opening of the former has no effect at this time since the previous opening of switch 191 interrupted current flow to relay 219. The opening of switch 222 has no effect at this time either since the prior opening of switch 224 interrupted current flow through the circuit branch in which it is contained.

When the ram has been fully retracted following the operation of the stamping device 117 and 118 and the air cylinders have fully retracted the clutches 75 and the nozzle 103, the apparatus will be in condition for the next succeeding cycle of operation. This cycle will be initiated, as soon as the ram has retracted, by the movement of the index table to register the next body to be tested with the ram. The operations of the mechanisms previously described will be repeated. The body tested during the preceding cycle of operation of the apparatus will be aligned with the mechanism 24 which unscrews it from the holder. This mechanism has previously been described. The only difference between this mechanism and the similar one described previously is that the motor rotates in a reverse direction so that the body will be unscrewed from the adaptor.

As long as the bodies are supplied to the holders and they satisfactorily withstand the test, the machine will continue to operate. As previously mentioned, however, in the event a body is not properly positioned on its holder or does not withstand the pressure test, one or the other of switches 144 or 145 will be opened and the circuit for relay 148 will be broken. Switch 152 will open breaking the circuit for relay 160. The machine will cease operation, valve 181 closing to stop the index table instantly. While switch 167 of relay 160 opens the ram will, if its cycle of operation has been initiated, continue to complete its cycle.

When relay 148 is de-energized, switch 154 closes and completes a circuit containing lamp 141. The operator and inspector will then be advised that the machine is not in operation and that the fault causing the interruption must be corrected before operations can be resumed. The key switch 140 and the starting switch 163 must be closed again to start the machine in operation.

While the form of embodiment of the present invention as herein disclosed constitutes a preferred form, it is to be understood that other forms might be adopted, all coming within the scope of the claims which follow:

We claim:

1. Rocket body hydrostatic testing apparatus comprising, in combination, a hydraulic power cylinder with a piston and ram; a plurality of rocket body holders; means operated in timed relation with said ram to successively dispose said holders adjacent said ram; means for securing a rocket body in fluid tight relationship on each holder; means for filling the bodies with fluid after they have been secured to said holders; and means including a plunger and fluid containing cylinder communicating with the interior of said bodies through said holders, said plunger being of predetermined size relative to the piston of said power cylinder and registering with said ram when the holders are disposed adjacent thereto, said plunger being operated by said ram to increase the pressure on the fluid within the body adjacent the ram.

2. Rocket body hydrostatic testing apparatus comprising, in combination, a hydraulic press having a ram; a plurality of rocket body holders; means operated in timed relation with said press to successively dispose said holders adjacent said ram; means in advance of said ram for engaging the rocket bodies and securing the same in substantially fluid tight relationship on said holders; means between said ram and the last-named means for filling said bodies with fluid after they have been secured to said holders; means including a plunger and fluid containing cylinder communicating with the interior of said bodies through said holders, the plunger of said means registering with said ram when a holder is disposed adjacent thereto, said ram serving to actuate said plunger to increase the pressure on the fluid within the body on the holder; and means for interrupting the operation of the apparatus in the event of escape of fluid from the body undergoing test.

3. Rocket body hydrostatic testing apparatus comprising, in combination, a hydraulic press having a ram; a plurality of rocket body holders; means associated with said press and operative to successively dispose said holders adjacent said ram; means in advance of said ram for engaging the rocket bodies and securing the same in substantially fluid tight relationship on said holders; means between said ram and said last-named means for filling said bodies with fluid after they have been secured to said holders; means registering with the ram when the holders are disposed adjacent thereto and operated by the ram to increase the pressure on the fluid within said bodies; and means for interrupting the operation of the apparatus in the event of escape of fluid from said bodies.

4. Rocket body hydrostatic testing apparatus comprising, in combination, a hydraulic press having a ram; a plurality of rocket body holders; means associated with said press and operative to successively dispose said holders adjacent said ram; means in advance of said ram for engaging the rocket bodies and securing the same in substantially fluid tight relationship on said holders; means between said ram and the last-named means for filling said bodies with fluid after they have been secured to said holders; means registering with the ram when the holders are disposed adjacent thereto and operated by the ram to increase the pressure on the fluid within said bodies; and means for engaging said bodies and removing them from the holders.

5. Rocket body hydrostatic testing apparatus comprising, in combination, a hydraulic press having a ram; an index table with a plurality of stations; rocket body holding and testing mechanism at each of the stations on said index table, said mechanism having an adaptor for receiving a rocket body and sealing the open ends thereof; a fluid receiving cylinder communicating with the interior of a rocket body on said adaptor; a plunger disposed for movement in said cylinder to force fluid therefrom into the rocket body; and means for intermittently rotating said index table to successively register the plungers of the testing mechanism at said stations with said ram.

6. Rocket body hydrostatic testing apparatus comprising, in combination, a hydraulic press having a ram; an index table with a plurality of stations; means for intermittently rotating said index table to successively register the stations with said ram; rocket body holding and testing mechanism at each of the stations on said index table, said mechanism having an adaptor with threads for receiving threads on said rocket bodies; and means disposed in registration with a station on said table in advance of said ram for engaging and turning the rocket bodies to screw the same onto the adaptors to secure a substantially fluid tight engagement.

7. Rocket body hydrostatic testing apparatus comprising, in combination, a hydraulic press having a ram; an index table with a plurality of stations; means for intermittently rotating said index table to successively register the stations with said ram; rocket body holding and testing mechanism at each of the stations on said index table, said mechanism having an adaptor with threads for receiving threads on said rocket bodies; a motor disposed in registration with a station on said table in advance of said ram; and means for separably connecting the rocket bodies with said motor to rotate the bodies and screw the same onto the adaptors to secure a substantially fluid tight engagement.

8. Rocket body hydrostatic testing apparatus comprising, in combination, a hydraulic press having a ram; an index table with a plurality of stations; means for intermittently rotating said index table to successively register the stations with said ram; rocket body holding and testing mechanism at each of the stations on said index table, said mechanism having an adaptor with threads for receiving threads on said rocket bodies; a motor disposed in registration with a station on said table in advance of said ram; and a hydraulically actuated chuck for separably connecting the rocket bodies with said motor to rotate the bodies and screw them into substantially fluid tight engagement on said adaptors.

9. Rocket body hydrostatic testing apparatus comprising, in combination, a press with a hydraulic ram; an index table with a plurality of stations; means for intermittently rotating said index table to successively register the stations with said ram; rocket body holding and testing mechanism at each of the stations on said index table, said mechanism having a threaded adaptor; a member resiliently supported on said adaptor and entering a rocket body applied thereto; sealing means on said resiliently supported member for engaging the interior of said rocket body; a motor disposed in registration with a station on said table in advance of said ram; means for separably connecting the rocket bodies with said motor to rotate the bodies and screw them into substantially fluid tight engagement on said adaptors; and means for engaging and moving said resiliently supported members to disengage said sealing means from said rocket bodies while they are being screwed onto said adaptors.

10. Rocket body hydrostatic testing apparatus comprising, in combination, a hydraulic ram; an index table having a plurality of stations; means for intermittently moving said table to successively register said stations with said ram; rocket body holding means arranged at each station on said index table, said holding means including a threaded adaptor; a member resiliently mounted on said adaptor, said member being disposed within a rocket body when the latter is supported on the adaptor; sealing means carried by said resiliently mounted member, said sealing means engaging the inner surface of a rocket body when the latter is supported on the adaptor; and means registering with a station on said index table in advance of said ram for filling the rocket bodies with testing fluid, said means having a member for engaging said resiliently mounted member and moving it to disengage said sealing means from the inner surfaces of said rocket bodies.

11. In a rocket body hydrostatic testing apparatus, a hydraulic ram and means operated by said ram to apply pressure to fluid in the bodies being tested; an index table having a plurality of stations; means for intermittently moving said table to successively register said stations with said ram; rocket body holding means arranged at each station on said index table, said holding means including a threaded adaptor; a member resiliently mounted on said adaptor, said member being disposed within a rocket body when the latter is supported on the adaptor; sealing means carried by said resiliently mounted member, said sealing means engaging the inner surface of a rocket body when the latter is supported on the adaptor; means registering with a station on said index table in advance of said ram for filling said rocket bodies with testing fluid, said means having a source of testing fluid under pressure; a filling nozzle; a valve for controlling fluid flow from said nozzle; and a member for engaging said resiliently mounted member and moving it to disengage said sealing means from the inner surfaces of said rocket bodies and opening the valve of said filling nozzle.

12. In a rocket body hydrostatic testing apparatus a hydraulic ram and means operated by said ram to apply pressure to fluid in the bodies being tested; an index table having a plurality of stations; means for intermittently moving said table to successively register said stations with said ram; rocket body holding means arranged at each station on said index table, said holding means including a threaded adaptor; a member resiliently mounted on said adaptor, said member being disposed within a rocket body when the latter is supported on the adaptor; sealing means carried by said resiliently mounted member, said sealing means engaging the inner surface of a rocket body when the latter is supported on the adaptor; means registering with a station on said index table in advance of said ram for threading rocket bodies on said adaptors, said means having a motor and fluid pressure responsive means for connecting the rocket bodies to said motor to be rotated thereby and screwed onto the adaptors; means in connection with said body and motor connecting means for engaging said resiliently mounted means and moving the same to disengage said sealing means from the rocket bodies during rotation thereof; and means registering with a station on said index table between said rocket rotating means and said ram for filling said rocket bodies with testing fluid, said means having a member for engaging said resiliently mounted member and moving the same to disengage said sealing means from the rocket body during the filling operation.

13. Apparatus for hydrostatically testing rocket bodies comprising, in combination, a hydraulic ram; an index table with a plurality of stations; fluid pressure responsive means for intermittently moving said table to successively register said stations with said ram; rocket body holding and testing means arranged at each station on said index table; fluid pressure responsive means disposed in registration with a station on said index table in advance of said ram for securing rocket bodies on said holding means; fluid pressure responsive means disposed between said body securing means and said ram for filling said bodies with testing fluid; a member forming a part of said testing means and actuated by said ram to apply pressure to the fluid in the rocket body at the station registering with said ram; fluid pressure responsive means disposed in registration with a station on said index table beyond said ram for releasing said bodies from said holding means; electro-responsive means including a circuit for controlling the operations of said table moving means, said ram, said body securing and releasing means, said body filling means; and switch means in said circuit operated in response to excessive movement of said ram to break said circuit and interrupt the operation of the apparatus.

14. Apparatus for hydrostatically testing rocket bodies comprising in combination, a hydraulic ram; an index table with a plurality of stations; fluid pressure responsive means for intermittently moving said table to successively register said stations with said ram; rocket body holding and testing means arranged at each station on said index table; fluid pressure responsive means disposed in registration with a station on said index table in advance of said ram for securing rocket bodies on said holding means; fluid pressure responsive means disposed between said body securing means and said ram for filling said bodies with testing fluid; a member forming a part of said testing means and actuated by said ram to apply pressure to the fluid in the rocket body at the station registering with said ram; fluid pressure responsive means disposed in registration with a station on said index table beyond said ram for releasing said bodies from said holding means; electro-responsive means including a circuit for controlling the operations of said table moving means, said ram, said body securing and releasing means and said body filling means; an electro-responsive warning signal; and switch means in said circuit operated in response to excessive movement of said ram to break said circuit and interrupt the operation of the apparatus and initiate the operation of said warning signal.

15. In a rocket body hydrostatic testing apparatus of the type having a hydraulic ram; means operated by said ram to apply pressure to fluid in the bodies being tested, said means having a cylinder; a plunger extending into said cylinder; a holder for a rocket body to be tested, said holder having a threaded base for receiving the rocket body and passages communicating with said cylinder; a post projecting from said base; a member resiliently supported on said post; and gasket supporting head on said member for engaging the inner surface around an opening in a rocket body positioned on said base.

16. In a rocket body hydrostatic testing apparatus of the type having a hydraulic ram; means operated by said ram to apply pressure to fluid in the bodies being tested, said means having a cylinder; a plunger extending into said cylinder; a holder for a rocket body to be tested, said holder having a base formed for the removable reception of a rocket body and passages communicating with said cylinder; a post projecting from said base; a member supported for sliding movement on said base, said member having a flared end to guide the rocket bodies during application to said base; resilient means between said member and said base, a tapered head on said member for engaging the inner surface around an opening in a rocket body positioned on said base; and a sealing gasket carried by said tapered head.

17. In a rocket body hydrostatic testing apparatus of the type having a ram and means operated thereby to apply pressure to fluid in the bodies being tested, a rocket body holder having a base formed for the removable reception of a rocket body; means resiliently supported on said base for engaging and internally sealing the open upper end of a rocket body disposed on said base; means for applying a rocket body to said base, said means having an element for engaging and moving said sealing means to space the same from the rocket body; and means for gripping a rocket body and moving the same to secure it to said base.

18. In a rocket body hydrostatic testing apparatus of the type having a ram and means operated thereby to apply pressure to fluid in the bodies being tested, a rocket body holder having a base formed for the removable reception of a rocket body; means resiliently supported on said base for engaging and internally sealing the open upper end of a rocket body disposed on said base; means for applying a rocket body to said base, said means having an element for engaging and moving said sealing means to space the same from the rocket body; chuck means for gripping a rocket body; and motor means for rotating the body gripped by said chuck means to secure the same on said base.

19. In a rocket body hydrostatic testing apparatus of the type having a ram and means operated thereby to apply pressure to fluid in the bodies being tested, a rocket body holder having a base formed for the removable reception of a rocket body; means resiliently supported on said base and extending up into a rocket body disposed on said base for engaging and internally sealing the open upper end thereof; means for applying a rocket body to said base; and means for filling the rocket body with fluid after it has been applied to said base.

20. In a rocket body hydrostatic testing apparatus of the type having a ram and means operated thereby to apply pressure to fluid in the bodies being tested, a rocket body holder having a base formed for the removable reception of a rocket body; means resiliently supported on said base for engaging and internally sealing the open upper end of a rocket body disposed on said base; means for applying a rocket body to said base; means for filling the rocket body with fluid after it has been applied to said base, said means having an element for engaging and moving said sealing means to render the same inoperative; nozzle means for directing a stream of fluid into said rocket body, and a valve carried by said nozzle, said valve being opened by said element after said sealing means has been moved to an inoperative position.

References Cited in the file of this patent

UNITED STATES PATENTS

| Number | Name | Date |
|---|---|---|
| 1,282,120 | Patterson | Oct. 22, 1918 |
| 1,613,150 | Zore | Jan. 4, 1927 |
| 1,670,138 | Cockburn | May 15, 1928 |
| 2,084,653 | Preston | June 22, 1937 |
| 2,232,711 | Maher | Feb. 25, 1941 |
| 2,279,730 | Bradley | Apr. 14, 1942 |
| 2,323,091 | Johnston et al. | June 29, 1943 |
| 2,493,061 | Devine et al. | Jan. 3, 1950 |
| 2,528,563 | Testut et al. | Nov. 7, 1950 |
| 2,538,887 | Smith | Jan. 23, 1951 |
| 2,565,460 | Woodlief | Aug. 21, 1951 |
| 2,578,728 | Musser | Dec. 18, 1951 |